United States Patent
Minet

[15] 3,670,481
[45] June 20, 1972

[54] MACHINE FOR HARVESTING SUGAR CANE

[72] Inventor: Albert Gustave Minet, Bellevue, rue Bir-Hakem 77, Le Mee sur Seine, France

[22] Filed: Sept. 30, 1968

[21] Appl. No.: 763,825

[30] Foreign Application Priority Data

Oct. 12, 1967 France..............................67124293

[52] U.S. Cl..................................56/10.4, 56/12.7, 56/12.8, 56/13.8
[51] Int. Cl. .........................................................A01d 41/08
[58] Field of Search......................................................56/17

[56] References Cited

UNITED STATES PATENTS 2,458,299  1/1949  Powers ......................................56/17
3,472,299  10/1969  Vyaznikov et al....................56/17 UX Primary Examiner—Robert Peshock
Attorney—Arnold Robinson

[57] ABSTRACT

A machine to harvest sugar cane comprising a cutting disk to cut the standing cane. The disk is mounted on a convex shaped member gliding on the ground.

A chain assembly seizes the cut cane to lead it between two belts which introduce it in an airblast column.

At the entry of the airblast column, the cut cane is sliced sideways in the sense of movement of the cane.

In the airblast column the cane is stripped and then loaded in a pick-up cart while the wastes are left on the ground.

10 Claims, 6 Drawing Figures

MACHINE FOR HARVESTING SUGAR CANE

Multiple types of machines are known either self-propelled or towed, which are utilized for the harvesting of sugar cane. The operations which such a machine should be capable of performing are cutting the cane at the base, cutting this in pieces and stripping for filling in the pick-up carts while the wastes are left on the place and serve as fertilizer.

None of the known machines completely provides these operating processes, in effect, the inclined cane with respect to the row of planting are not cut but pulled up and the stripping is incomplete since it leaves in general 5 percent of the leaves at least.

The present invention concerns a combined machine for cutting the sugar cane, (that may be self-propelled or towed) which completely solves the problems set forth above. This machine eliminates the necks and cuts just above the ground with a ground gliding member acting near the roots; it is able to cut the cane much inclined in the row or in any direction without pulling up the cane root. It cuts the useful cane in pieces of 5 to 30 centimeters as needed; it completely strips the sugar cane once it has been cut in pieces; it loads the pieces in carts.

The invention has then for an object a sugar cane harvesting machine characterized by the fact that it comprises on the one hand a rotatable disk supplied with knives, the disk being mounted on a disk shaped ground gliding member, on the other had a chain assembly lightly seizes the cane above the line of cutting and drives it rapidly towards two belts which introduce it in an airblast column in the form of an S at the entry of which it is cut in pieces by a slicing knife sideways in the sense of advance.

Other complimentary characteristics of the invention will be revealed from the description with references to the annexed drawing. It is to be understood, the description and the drawing are only given as indicative example and by no means limiting.

Figure 1:
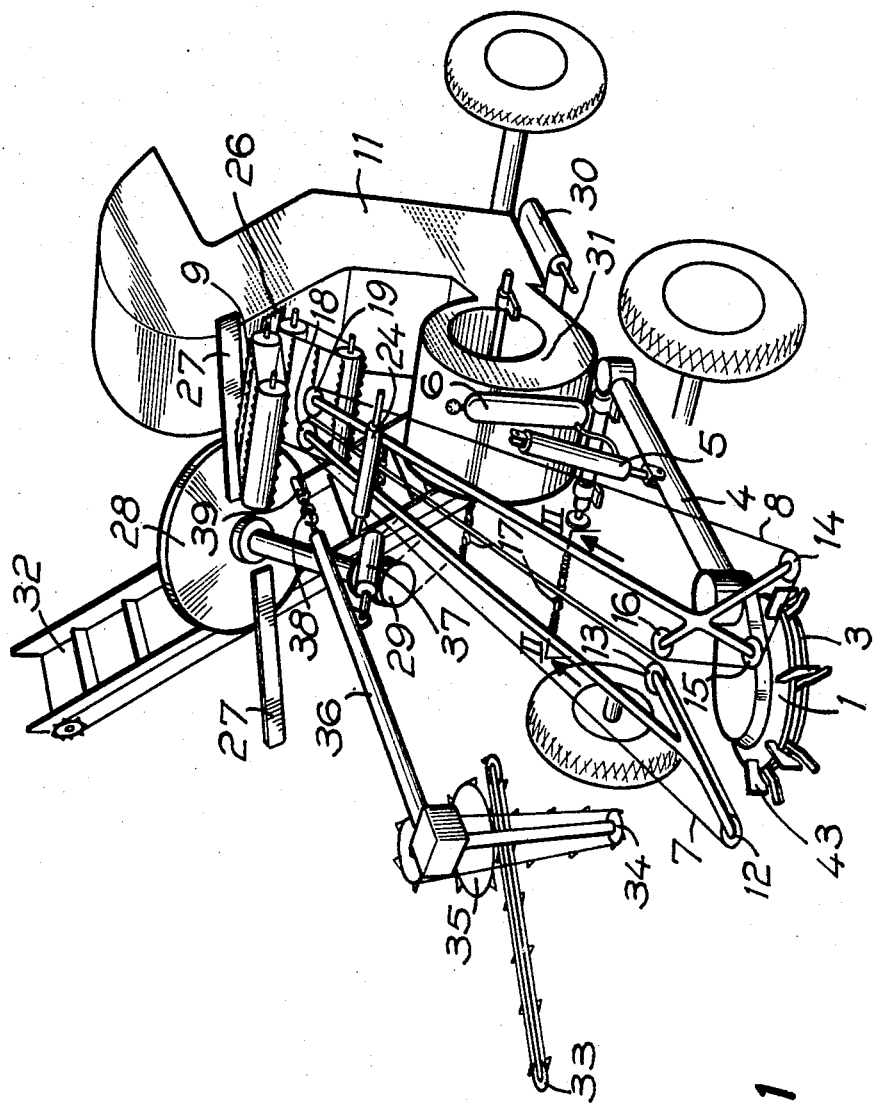
FIG. 1 is a perspective view of a machine according to the invention.
Figure 2:
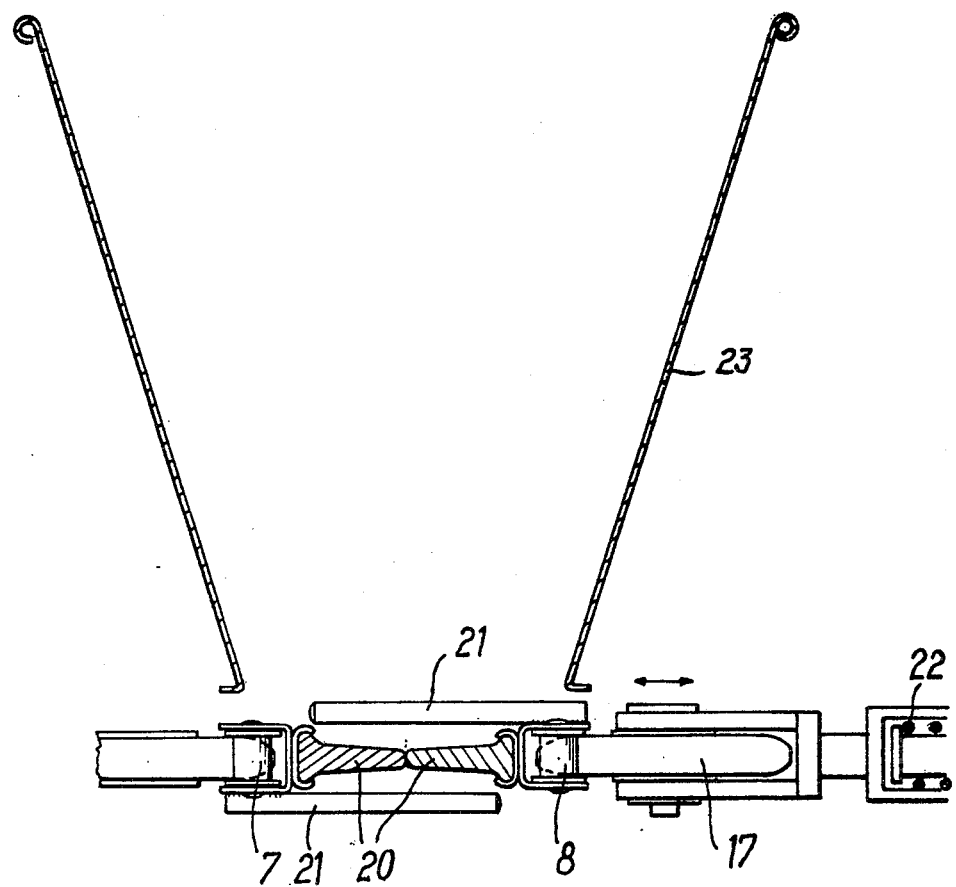
FIG. 2 is a sectional view taken along the line II — II of FIG. 1 of the chain drive device.
Figure 3:
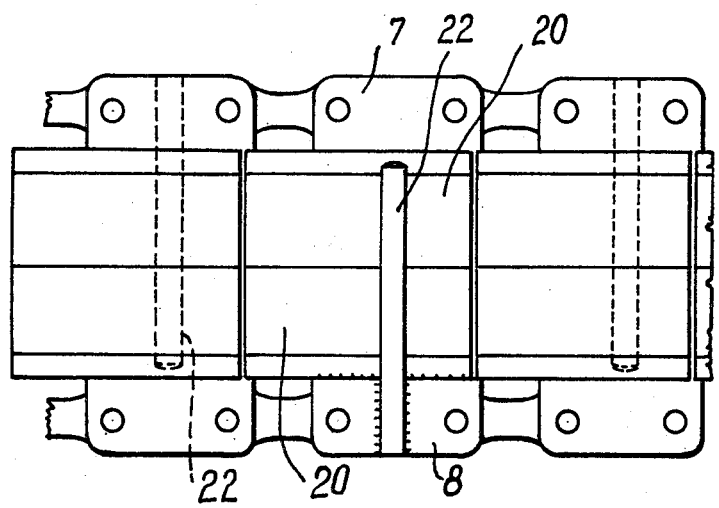
FIG. 3 is a top view of the two chains of FIG. 2.

The machine according to the invention as shown in the drawing, comprises a rotating disk 1 supplied with knives 2 which extend radially and which follow the shape of a convex ground gliding member 3 mounted under the disk 1 and turning freely on the same spindle as that of the disk 1.

The elements which form the cutting device of the machine are mounted on a rocking arm 4 at the interior of which are positioned the gears and transmission shaft. The arms 4 are supported by the jack 5 mounted on the chassis which is designed to limit the force of the ground gliding member pressing on the ground. The jack is connected to a compressed air reservoir 6 of large capacity of the type which the variations of position of the arm do not influence in practice the force pressing the reproducer.

In practice the canes cut at the ground are seized at the base between two chains 7 and 8 which are driven at high speeds towards a device having a pair of belts 9 and 10 which introduces the canes in an airblast column 11 where the operation of stripping (or effeuillage) takes place.

The chain 7 near the cutting disk is held between two wheels 12 and 13 and forms a ramp against which the canes are projected at the moment of their being cut while the chain 8 is held on three wheels 14, 15 and 16, the part between the wheels 14 and 15 straightening the cane lying on their side while the part between the wheels 15 and 16 drives them towards the portion where the chains 7 and 8 are in side by side position guided by the guide wheels 17.

The chains 7 and 8 which are driven by the toothed wheels 18 and 19 are provided on the one hand with plates 20 of gum or flexible rubber which grasp the cane without crushing and on the other hand with fingers 21 disposed under the chain 7 and above the chain 8 which drive the cane before it is seized by the plates 20.

The guide wheels 17 which guide the chains are mounted on the spring supports 22 in a manner to be able to separate at the passing of a cane grasped between the two chains.

The chains 7 and 8 turn by side at the base of a V-shaped housing 23 which guides laterally the cane.

The cane in leaving the chains 7 and 8 is put in a horizontal position by bar 24, and is taken between the belts 9 and 10 which are supplied with toothed members 25 and place the cane in column 11 by an opening 26 against which pass the knives 27 mounted on a flywheel 28 rotatably driven by a belt-drive 29 connected with a motor (not shown).

The positioning of the knives 27 and the opening 26 is such that the cutting of the cane is made sideways in the sense of advancement.

The piece of cane is projected against the wall and by successive ricochets reaches the bottom of the tower where it is collected on the belt 30.

The tower in the form of an S permits the piece of cane to be presented across the airblast produced by the lower 31, in the most favorable position to completely strip, and force them to turn at the ricochet on striking the walls in all positions crossed by the pieces of cane in the airblast.

The belt 30 removes the pieces of cane towards an elevator 32 which discharges them in a pick-up cart.

The machine is moreover provided with a cutoff device, composed of a pair of chains 33 and 34 with driving teeth leading the heads of the cane to the knife disk 35.

This device is mounted at the end of an arm 36 which is controllable in height by means of a jack 37, the crossarm 36 receiving a driving shaft joined by a universal joint 38 to a motor shaft 39.

Figure 5:
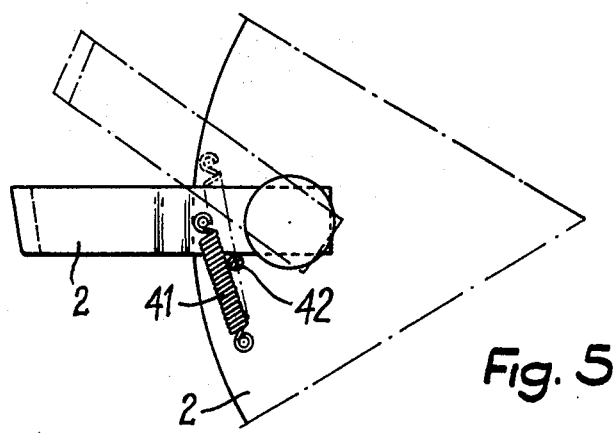
FIG. 5 is a bottom view of the knives of FIG. 4.
Figure 4:
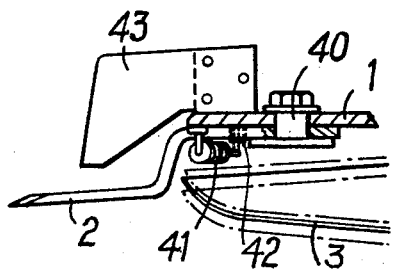
FIG. 4 is a detailed view of the knives and reproducer of FIG. 1.

The knives 2 (FIGS. 4 and 5) are freely mounted on a pivot 40 mounted on the disk 1 in a manner to provide retracting when it encounters a rock for example. The centrifugal force being insufficient to reposition the knives in radial position, a coil spring 41 is provided to reposition the knives against the stop 42 determining the cutting position. The disk is moreover provided with paddles 43 to the right of each knife, the paddles project the cane on the chain 7.

The same motor is able to drive the different chains, belts and cutting devices due to the gearing permitting the proper speeds to be obtained.

Moreover, the exit of the waste(feuilles) at the top of the column may be supplied with a flexible guide permitting to dispose them on the row of planting freshly cut and avoiding scattering them to the surroundings.

In another embodiment, the machine according to the invention may be provided for cutting two rows of sugar cane.

Figure 6:
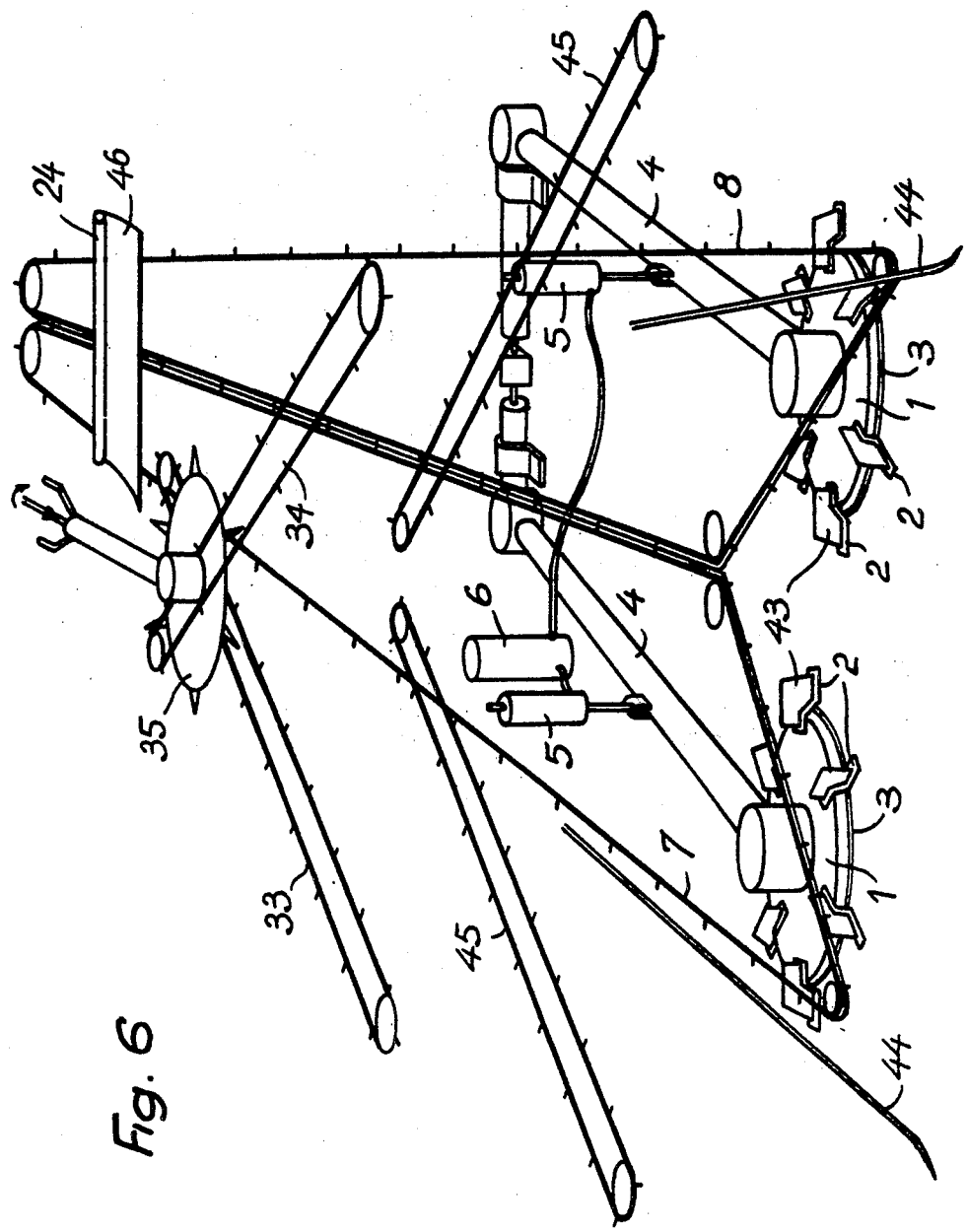
FIG. 6 is a schematic view of a machine in accordance with the invention having two cutting lines.

As schematically represented in FIG. 6, the machine includes two symmetric chains 7 and 8 and two cutting disks 1 mounted on independent arms 4, it is also provided with two bars 44 which straighten the cane before cutting the two intermediate chains 45 driving the cut cane.

In this case, the head cutoff device acts on the cut cane and not before as previously.

The bar 24 which places the cane horizontal is now supplied with a deflector 46 acting to progressively flatten the cane before it is introduced, as for the machine of FIG. 1, between the belts 9 and 10.

The invention is not limited to the embodiments described and shown, but covers, to the contrary, all variations.

What I claim is:

1. In a machine for harvesting sugar cane the improvement which comprises a ground gliding member, yieldable means for mounting said member in position to glide over the ground, a plurality of cutters, means for mounting and rotating said cutters adjacent the bottom of said ground gliding member for cutting the cane, a stripping column, means for blowing air through said column, means for conveying the cane after it has been cut, said conveying means being adapted to feed the cut cane into said airblast column for stripping and a cutter for cutting the cane into pieces before it is fed into said airblast column.

2. A machine for harvesting sugar cane as specified in claim 1 wherein said ground gliding member is mounted on the same center as said plurality of cutters and wherein said member is free to rotate relative to said yieldable mounting means.

3. A machine for harvesting sugar cane as specified in claim 1 wherein said yieldable means for mounting said ground gliding member include an arm pivotally mounted on the chassis by means of a jack having a compressed air reservoir of sufficient volume with respect to that of the jack so that the action of support of the jack is appreciably the same in any position into which the arm pivots.

4. A machine for harvesting sugar cane as specified in claim 1 wherein said means for mounting and rotating the plurality of cutters are adapted to yield and follow the movement of the ground gliding member as it travels over the ground and wherein the cutters each have horizontal cutting portions that extend radially out from the edge of the gliding member.

5. A machine for harvesting sugar cane as specified in claim 4 wherein said means for mounting and rotating the plurality of cutters include a rotating disk and pivotal means for mounting each cutter including springs adapted to maintain said knives in radial position.

6. A machine for harvesting sugar cane as specified in claim 1 wherein said conveying means include plates of a compressible elastic material which assist in conveying the cane.

7. A machine for harvesting sugar cane as specified in claim 6 wherein said conveying means include fingers extending to the exterior of said elastic plates.

8. A machine for harvesting sugar cane specified in claim 6 wherein said conveying means include a housing of V-form.

9. A machine for harvesting sugar cane as specified in claim 1 wherein said plurality of cutters each have a paddle associated therewith to assist in moving the cane towards said conveying means.

10. A machine for harvesting sugar cane as specified in claim 1 which includes a second ground gliding member and associated plurality of cutters mounted to operate in spaced relationship to the said first mentioned ground gliding member.

* * * * *